United States Patent [19]
Blomgren

[11] Patent Number: 5,634,118
[45] Date of Patent: May 27, 1997

[54] SPLITTING A FLOATING-POINT STACK-EXCHANGE INSTRUCTION FOR MERGING INTO SURROUNDING INSTRUCTIONS BY OPERAND TRANSLATION

[75] Inventor: James S. Blomgren, San Jose, Calif.

[73] Assignee: Exponential Technology, Inc., San Jose, Calif.

[21] Appl. No.: 419,122

[22] Filed: Apr. 10, 1995

[51] Int. Cl.$^6$ ........................................ G06F 9/40
[52] U.S. Cl. ..................... 395/567; 395/563; 395/378; 395/800
[58] Field of Search ................... 395/375, 800, 395/567, 378, 563

[56] References Cited

U.S. PATENT DOCUMENTS

| | | | |
|---|---|---|---|
| 5,164,943 | 11/1992 | Waggoner | 371/3 |
| 5,319,757 | 6/1994 | Moore et al. | 395/375 |
| 5,355,457 | 10/1994 | Shebanow et al. | 395/375 |
| 5,367,650 | 11/1994 | Sharangpani et al. | 395/375 |
| 5,446,912 | 8/1995 | Colwell et al. | 395/800 |
| 5,497,493 | 3/1996 | Colwell et al. | 395/800 |
| 5,499,352 | 3/1996 | Clift et al. | 395/412 |
| 5,522,051 | 5/1996 | Sharangpani | 395/375 |
| 5,524,262 | 6/1996 | Colwell et al. | 395/800 |
| 5,548,776 | 8/1996 | Colwell et al. | 395/800 |

OTHER PUBLICATIONS

Microprocessor Report, Feb. 16, 1995, pp. 10–11.

Primary Examiner—William M. Treat
Assistant Examiner—Zarni Maung
Attorney, Agent, or Firm—Stuart T. Auvinen

[57] ABSTRACT

A stack-register swap or exchange instruction is executed by splitting the exchange into two halves, and then each half is absorbed into a surrounding instruction by translating its source or destination operands. If one or both surrounding instructions are absent, then one or both halves of the exchange instruction are inserted into the pipeline as separate pipeline flows. When the surrounding instructions are stack-based, the stack operands are first converted to a destination and two source operands that specify a register by absolute number. A translation circuit then translates one of the operands of a surrounding instruction so the surrounding instruction's source is read from the exchange instruction's source, or so that the surrounding instruction's destination is written to the exchange instruction's destination, eliminating the need for processing a separate exchange instruction. Pipelining avoids the need for a temporary register to hold the swap data, since both the register are read early in the pipeline before either instruction over-writes the register.

20 Claims, 11 Drawing Sheets

FADD ST, ST(X) ⟶ FADD ST, STY, STX
FADD STY, ST, STX

FADD DST, SRC1, SRC2

FXCH ST, ST3 :

|  |  | ST | ST1 | ST2 | ST3 | DATA OP |
|---|---|---|---|---|---|---|
|  |  | A | B | C | D |  |
| fmove1 | ST3, ST |  |  |  |  | A -> ST3 |
|  |  | A | B | C | A |  |
| fmove2 | ST, ST3 |  |  |  |  | D -> ST |
|  |  | D | B | C | A |  |

FIG. 3A

| Clocks | 1 | 2 | 3 | 4 | 5 | 6 | 7 |
|---|---|---|---|---|---|---|---|
| fmove1 | F0<br>Read<br>ST | F1 | F2 | F3 | F4 | F5<br>Write<br>ST3 |  |
| fmove2 |  | F0<br>Read<br>ST3 | F1 | F2 | F3 | F4 | F5<br>Write<br>ST |

FIG. 3B

| INSTRUCTION | | ST | ST1 | ST2 | ST3 | DATA OP |
|---|---|---|---|---|---|---|
| | | A | B | C | D | |
| FADD | ST, ST1 | | | | | A+B -> I -> ST |
| | | I | B | C | D | |
| FXCH | ST, ST3 | | | | | D -> ST, I -> ST3 |
| | | D | B | C | I | |
| FADD | ST, ST2 | | | | | D+B -> J -> ST |
| | | J | B | C | I | |

FIG. 4A

| INSTRUCTION | | ST | ST1 | ST2 | ST3 | DATA OP |
|---|---|---|---|---|---|---|
| | | A | B | C | D | |
| FADD | ST, ST, ST1 | | | | | A+B -> I -> ST |
| | | I | B | C | D | |
| FXCH | ST, 0, ST3 | | | | | D -> ST, I -> ST3 |
| | | D | B | C | I | |
| FADD | ST, ST, ST2 | | | | | D+C -> J -> ST |
| | | J | B | C | I | |

FIG. 4B

| INSTRUCTION | | ST | ST1 | ST2 | ST3 | DATA OP |
|---|---|---|---|---|---|---|
| | | A | B | C | D | |
| FADD | ST3, ST, ST1 | | | | | A+B -> I -> ST3 |
| | | A | B | C | I | |
| FADD | ST, ST3, ST2 | | | | | D+C -> J -> ST |
| | | J | B | C | I | |

FIG. 4C

| INSTRUCTION | | ST | ST1 | ST2 | ST3 | DATA OP |
|---|---|---|---|---|---|---|
| | | A | B | C | D | |
| FADD | ST3, ST, ST1 | | | | | A+B -> I -> ST3 |
| | | A | B | C | I | |
| fmove2 | ST, ST3 | | | | | D -> ST |
| | | D | B | C | I | |
| <GAP> | ---------- | | | | | |
| | | D | B | C | I | |
| FADD | ST, ST, ST2 | | | | | D+C -> J -> ST |
| | | J | B | C | I | |

FIG. 5A

| INSTRUCTION | | ST | ST1 | ST2 | ST3 | DATA OP |
|---|---|---|---|---|---|---|
| | | A | B | C | D | |
| FADD | ST, ST, ST1 | | | | | A+B -> I -> ST |
| | | I | B | C | D | |
| <GAP> | ---------- | | | | | |
| | | I | B | C | D | |
| fmove1 | ST3, ST | | | | | I -> ST3 |
| | | I | B | C | I | |
| FADD | ST, ST3, ST2 | | | | | D+C -> J -> ST |
| | | J | B | C | I | |

FIG. 5B

SPLITTING A FLOATING-POINT STACK-EXCHANGE INSTRUCTION FOR MERGING INTO SURROUNDING INSTRUCTIONS BY OPERAND TRANSLATION

BACKGROUND OF THE INVENTION—FIELD OF THE INVENTION

This invention relates to floating point processors, and more particularly for an improvement in execution of a stack-position exchange instruction in a stack-based architecture.

BACKGROUND OF THE INVENTION—DESCRIPTION OF THE RELATED ART

Older architectures employed a stack model for access of registers by instructions. A traditional stack is a data structure arranged and accessed in a last-in-first-out (LIFO) fashion. Instructions specify inputs that are operands within this stack, and write their result back to the top of the stack. When two input operands are needed, the first operand will be the top-of-stack register, while the second operand will be specified by a relative offset from the top-of-stack to another register in the stack. Since instructions use the top-of-stack register as both the first operand and the result's destination, only the second operand needs to be specified. Stack-based architectures can reduce the size of the instruction as fewer fields are needed to specify source and destination registers, since the destination and first source are implicitly specified as the top-of-stack register.

While many stack architectures have faded into obscurity, numeric co-processors for the x86 architecture continue to use stack addressing. A huge amount of code has been written for older x86 processors, giving the x86's stack-based floating point architecture an extended life beyond what is expected based solely on its technical merits.

FIG. 1A is a diagram of a register stack. Data registers 10 store data for use by a processor. Top-of-stack pointer register 14 contains a pointer "TOS" to the next register to be accessed at the top of the stack, stack-top ST register 12. An instruction implicitly specifies that stack-top register 12 be used as a first source operand, OP1, and that a result of the instruction's operation RESULT be written back to stack-top register 12. The instruction explicitly specifies a second operand, OP2, by specifying the register 18 in data registers 10 where the second operand OP2 is stored. Register 18 is specified not by its absolute physical position within data registers 10, but by its relative position to stack-top ST register 12. Adder 16 adds the top-of stack pointer in pointer register 14 to the relative position specified in the instruction to obtain a pointer to register 18 storing the second operand OP2. Instructions may change the top-of-stack pointer TOS by incrementing, decrementing, or writing top-of-stack pointer register 14. A pop instruction may remove a register from the stack, incrementing the pointer, while a push instruction loads another register on the stack and decrements the stack pointer, for typical expand-down stacks. Thus different registers in data registers 10 may be the top-of-stack register 12 at different times.

Instructions in such a stack-based architecture are described by pseudo-code nomenclature such as "FADD ST, ST3", which specifies a floating point addition of the contents of stack-top ST register 12 and the third register from the top of the stack, ST3 as second operand OP2. The sum is written back to stack-top ST register 12.

A particular bottleneck for stack architectures is that most instructions both read and write the top-of-stack, ST. Thus operands must be moved from other registers to the stack-top (ST) register before a floating point instruction is executed, and often the instruction's result must be moved off the register at the top of the stack so that another operand may be placed there for a following instruction. These persistent moves to and from the top of the stack add unproductive move instructions to the instruction stream. Inventors at Intel Corporation have recognized this problem, and have added a floating point exchange instruction, FXCH. This instruction exchanges the contents of the register at the top of the stack with the contents of another register in the stack in one atomic instruction. Thus "FXCH ST, ST5" requires a move from the fifth register from the top, ST5, to the stack-top register ST, and a second move from stack-top ST to register ST5. In effect, two moves are performed by the one FXCH instruction.

While this has improved the performance of the stack somewhat, the FXCH instruction is still an additional instruction that must be processed, holding back performance. Sharangpani and Sweedler, in U.S. Pat. No. 5,367, 650, assignee to Intel Corporation, have developed a method of executing the FXCH instruction in parallel with other instructions when certain circumstances are met. Unfortunately, these circumstances are not met about half of the time for purely random instructions. Additional hardware is used by Sharangpani and Sweedler to execute the exchange function outside of the normal execution facilities. A pointer table register file that contains a plurality of pointer registers is added. These pointer registers each store an address of one of the registers in the stack. Thus the data contained in the stack's registers are not physically moved or exchanged. Instead, two of the pointers in the pointer registers are exchanged by the special hardware. Thus registers are re-named by exchanging pointers rather than exchanging the data itself.

FIG. 1B is a diagram of a register-renaming and exchanging apparatus using a bank of pointer registers. Data registers 10 store floating point numbers. Top-of-stack pointer register 14 contains a pointer "TOS" to the top of the stack. However, this top-of-stack pointer from pointer register 14 is used to select a pointer register in pointer table 20. Pointer table 20 contains a plurality of pointer registers, each storing a 3-bit pointer to one of the eight data register in data registers 10. Thus TOS pointer from register 14 may be "011" indicating that the third logical register is the stack-top. The third pointer register 26 is selected, which contains the pointer "100" to the fourth physical register in data registers 10. Likewise the second operand, specified by its relative position X from the stack-top, is accessed by first adding in adder 16 the TOS pointer from register 14 to relative position X from the instruction, then using the sum from adder 16 to select the sixth pointer register 24 in pointer table 20. This sixth pointer register 24 contains the pointer "001", which selects the first physical register 18 in data registers 10, which contains the data for operand 2.

Exchange circuit 22 processes some exchange instructions by exchanging two of the pointers in pointer table 20. Thus an extra level of register re-mapping is accomplished by pointer table 20.

However, it is undesirable to add a bank of registers for the pointer table, not to mention all the control and sequencing logic to process this FXCH instruction separate from the execution pipelines. The bank of pointer registers is complex and expensive, as it has many read and write ports-five input ports and three output ports are shown as well as the two sets of ports for the exchange of the pointers in the pointer table (Sharangpani's FIG. 3, references 70, 71, 72, 73, 74, 75, 76, 77, 78, 79).

What is desired is a floating point processor that mimics a stack-based architecture having a register-exchange instruction. It is desired to achieve the effect of the exchange instructions without always explicitly executing the exchange instruction. The effect of the exchange instruction should be absorbed into surrounding instructions, eliminating the need to execute the exchange instructions in a floating point pipeline when surrounding instructions occur in a back-to-back sequence. It is also desired to eliminate the prior-art's additional bank of pointer registers (pointer table) for storing the addresses of each of the data registers in the stack.

SUMMARY OF THE INVENTION

A processor is adapted for executing an exchange instruction. A pointer table is not needed with the invention. The exchange instruction exchanges the contents of an exchange-destination register with the contents of an exchange-source register. A first half of the exchange instruction is processed by the preceding instruction and a second half of the exchange instruction is processed by the following instruction.

A translation circuit has a destination translation means for translating a first destination-register specifier of a preceding instruction which precedes the exchange instruction. The first destination-register specifier is replaced with an exchange-source specifier that specifies a register as the exchange-source register. The preceding instruction writes a result of an operation specified by the preceding instruction to the exchange-source register.

A source translation means translates a second source-register specifier of a following instruction which follows the exchange instruction. The second source-register specifier is replaced with the exchange-source specifier. Thus the following instruction reads the exchange-source register for a source operand. A means for removing removes the exchange instruction from further processing by the processor. The exchange instruction is removed when the destination translation means replaces the first destination-register specifier with the exchange-source specifier and the source translation means replaces the second source-register specifier with the exchange-source specifier. Thus a first half of the exchange instruction is processed by the preceding instruction and a second half of the exchange instruction is processed by the following instruction.

In further aspects a first means inserts a first move flow into a pipeline when the exchange instruction is processed and the destination translation means does not replace the first destination-register specifier with the exchange-source specifier. A second means inserts a second move flow into the pipeline when the exchange instruction is processed and the source translation means does not replace the second source-register specifier with the exchange-source specifier. Thus the exchange instruction is processed by the first and second move flows when the first destination-register specifier and the second source-register specifier are not replaced with the exchange-source specifier.

In still further aspects of the invention the first move flow is inserted into the pipeline during a first clock cycle and the second move flow is inserted into the pipeline during a second clock cycle, whereby the exchange instruction processed by the first and second move flows requires two clock cycles for insertion into the pipeline.

In other aspects the first half of the exchange instruction is processed by the preceding instruction but the second half of the exchange instruction is processed by the second move flow and not the following instruction when the following instruction does not immediately follow the exchange instruction. In some aspects of the invention the contents of the exchange-destination register and the contents of the exchange-source register each are binary numbers represented in a floating point format, where the floating point format including a mantissa portion and an exponent portion.

Other aspects of the invention include a method for processing an exchange instruction. A preceding instruction occurs before the exchange instruction in an instruction stream. The preceding instruction is a stack-based instruction that writes a result to the stack-top. The preceding instruction has a first destination-register specifier which is a current stack-top register. The first destination-register specifier for the preceding instruction is replaced with an exchange-source specifier that specifies the exchange-source register. The preceding instruction writes the result to the exchange-source register instead of the current stack-top register.

A following instruction occurs after the exchange instruction in the instruction stream. The following instruction is a stack-based instruction that reads a source operand from the stack-top. The following instruction has a first source-register specifier which is the current stack-top register. A second source-register specifier of the following instruction is replaced with the exchange-source specifier. Thus the following instruction reads the source operand from the exchange-source register instead of a second source register.

The exchange instruction is removed from further processing by a processor when the first destination-register specifier is replaced with the exchange-source specifier and the second source-register specifier is replaced with the exchange-source specifier. Thus a first half of the exchange instruction is processed by the preceding instruction and a second half of the exchange instruction is processed by the following instruction.

In further aspects the invention is a translator circuit for a processor. The translator circuit translates stack-based instructions into random-access-register-based instructions. The translator circuit also translates stack-based instructions to process a portion of a register-exchange instruction, allowing a modern RISC processor to support the older stack programming model of a CISC processor.

The translator circuit has a plurality of registers, with each register storing an operand or a result. A top-of-stack pointer register contains a pointer identifying a stack-top register in the plurality of registers. An incrementing means increments the pointer to the stack-top register, with the pointer pointing to a different one of the registers in the plurality of registers after being incremented. An exchange-source means receives an exchange-source position identifying a position relative to the stack-top register of an exchange-source for the register-exchange instruction. A destination of the register-exchange instruction is the stack-top register. A destination adder means receives the exchange-source position from the exchange-source means, and also receives the pointer to the stack-top register. It adds the exchange-source position to the pointer and outputs a sum as a first output when the register-exchange instruction and a preceding instruction are simultaneously being processed by the translator circuit. The preceding instruction specifies that a result be written to the stack-top register. The destination adder means otherwise outputting the pointer to the stack-top register as the first output.

A destination-specifier means receives the first output from the destination adder means and identifies one of the registers in the plurality registers as a destination register that the result of the preceding instruction will be written into. Thus the destination register of the preceding instruction is translated from the stack-top register to the exchange-source register when the register-exchange instruction and the preceding instruction are simultaneously being processed by the translator circuit.

BRIEF DESCRIPTION OF THE DRAWINGS

FIG. 3A shows that the stack exchange instruction, FXCH, can be accomplished by two move operations.

FIG. 3B is a diagram for a 6-stage pipeline that reads registers in first stage F0 and writes registers in last stage F5.

FIG. 4A shows a stack-exchange instruction FXCH sandwiched between two floating point add instructions FADD.

FIG. 4B shows a translation to 3-operand notation for the operations of FIG. 4A, with the first operand ST now appearing twice as the destination and the first source.

FIG. 4C shows that the FXCH exchange instruction can be deleted by translating the operands of the surrounding instructions.

FIG. 5A shows a flow being inserted into the pipeline when half of the FXCH is absorbed by translating the destination of a preceding instruction.

FIG. 5B shows a flow being inserted into the pipeline when half of the FXCH is absorbed by translating the first source of an instruction following FXCH.

DETAILED DESCRIPTION

The present invention relates to an improvement in stack-based processing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Basic Register Translation Apparatus

Figure 1A:
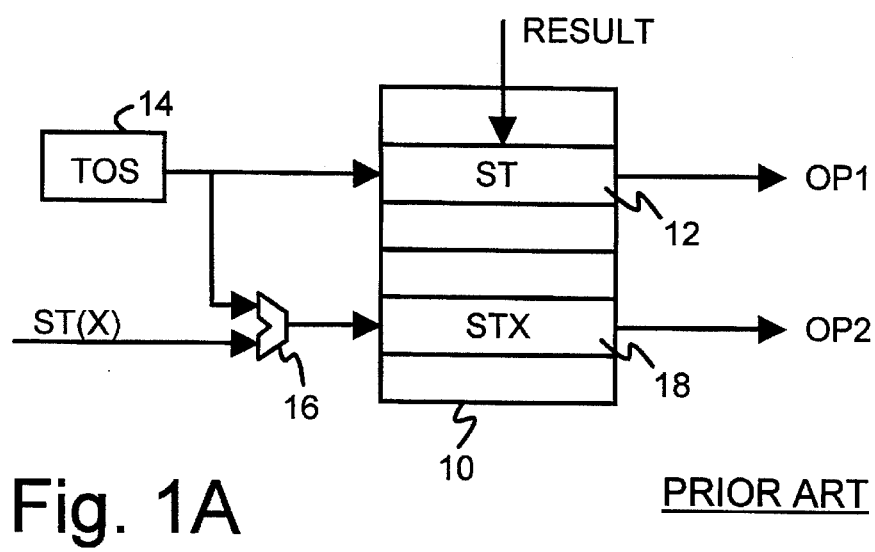
FIG. 1A is a diagram of a register stack.
Figure 1B:
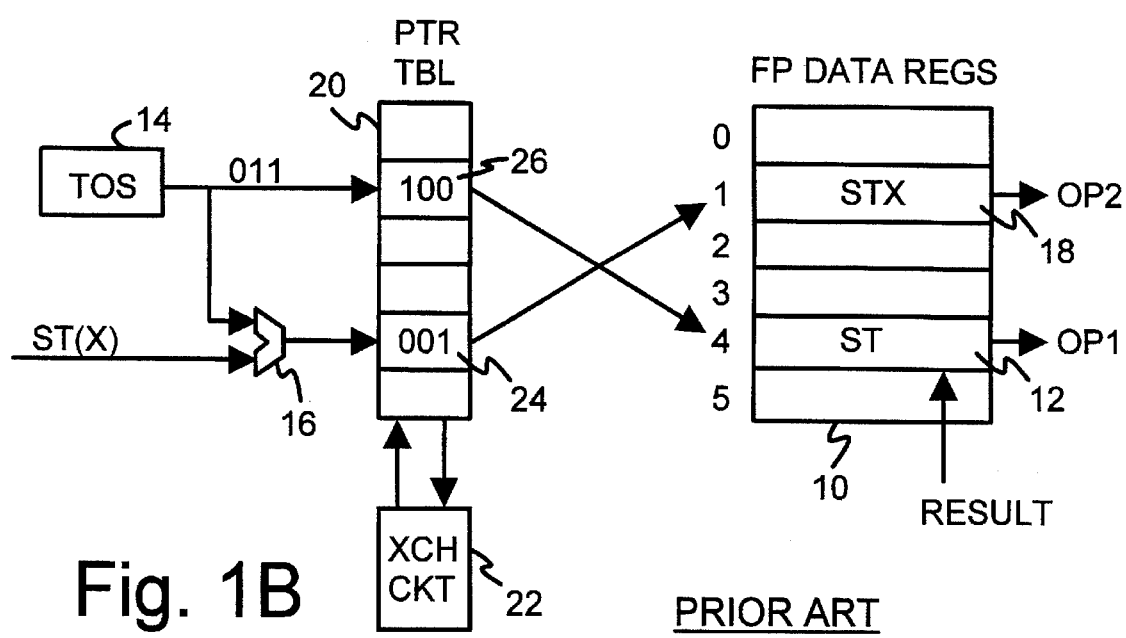
FIG. 1B is a diagram of a register-renaming and exchanging apparatus using a bank of pointer registers.
Figure 2:
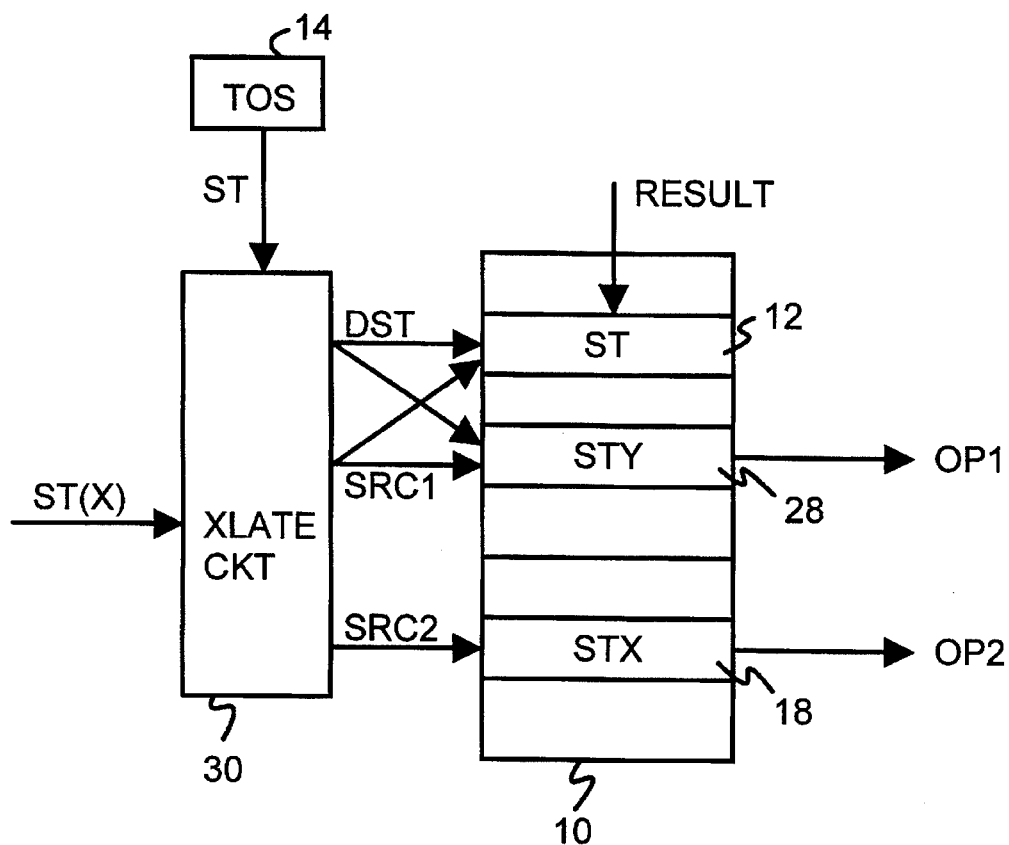
FIG. 2 is a diagram of a register-translation apparatus.

FIG. 2 is a diagram of a register translation apparatus. Top-of-stack pointer register 14 stores a 3-bit pointer TOS to the stack-top ST register 12 in data registers 10. An instruction being processed specifies the relative position X to the stack-top ST for STX register 18 storing the second operand OP2. Translate circuit 30 receives relative position X from the instruction and TOS pointer from register 14, and other information from a pipeline as will be discussed later. Translate circuit 30 outputs three register selects: first source SRC1, second source SRC2, and destination DST. Second source SRC2 selects the data stored in STX register 18 as the second operand OP2. First source SRC1 selects the first operand as the data stored in either stack-top register ST 12, or a third register STY 28. Likewise, destination DST selects that the result of the instruction's operation be written back to either stack-top register ST 12, or a third register STY 28.

Translate circuit 30 translates the single explicit operand specified by a stack-based instruction to a 3-operand generic instruction that is processed by a modern integer processor or floating point processor. Thus a stack based instruction such as "FADD ST, ST7" would be translated by translate circuit 30 to "FADD ST, ST, ST7" in the 3-operand format "FADD dst, src1, src2". When a stack-exchange instruction is encountered, translate circuit 30 may further translate the FADD instruction to either "FADD STY, ST, ST7" or "FADD ST, STY, ST7", where "STY" is a register at position "Y" exchanged by the stack-exchange instruction. This translation scheme allows the stack-exchange instruction to be removed from the instruction stream.

FXCH INSTRUCTION

The stack-exchange instruction has the mnemonic "FXCH" in the x86 instruction set. The FXCH instruction exchanges two registers in the floating point register file. The integer pipeline's general-purpose registers (GPR) which normally do not store floating point numbers are not affected by FXCH. Floating point code optimized for Intel's Pentium™ processor appear to use FXCH extensively. Perhaps earlier processors physically swapped stack register contents, while the Pentium™ used the pointer-table scheme to re-name the stack registers when a FXCH is processed, thus perhaps removing the FXCH from the pipelines.

FXCH does the work of three separate move instructions:
 a first move copies the first register's contents to a temporary register;
 a second move copies the second register's contents to the first register;
 a third move copies the temporary register's contents to the second register.

Thus two ordinary x86 move instructions, FST or FLD, would not accomplish the same work as a single FXCH instruction. These ordinary move instructions copy data rather than simply move it. Data must first be copied to a temporary register so that it is not overwritten by the next move instruction.

Pipeline Acts as Temporary Register

However, pipelining can be used to reduce the FXCH processing down to two register moves. In a pipelined floating point processor, the registers are read early in the pipeline, and then written several clock cycles later at the end of the pipeline. Between the read and the write of the register file, the contents of the register are being operated on by the pipeline's processing units, such as a floating point adder or multiplier. For a move, the operation is a null operation or no-op, such as adding zero or multiplying by one, or bypassing the operation units altogether. In effect, the register's contents are stored within the pipeline between the time the move instruction reads the register and the time it writes the contents back to another register. The register's contents may be over-written any time after it is read early in the pipeline. Thus if the two move instructions were close together in the pipeline, both would read the registers before either would write back to the register file.

Processing of FXCH by Two Pipeline Flows

FIG. 3A shows that the stack exchange instruction, FXCH, can be accomplished by two move operations. Although the preferred embodiment used eight floating point registers in the stack, only a 4-register stack is shown in FIGS. 3–4 for clarity. The four registers in the stack are designated ST, ST1, ST2, and ST3 for the stack-top register and the three following registers from the top. Stack-top register ST initially stores the datum "A", while registers 1, 2, 3 initially store data "B", "C", and "D", respectively. The exchange instruction FXCH is processed by generating two "flows" down the floating point pipeline. These two flows are not instructions in the instruction set, but are operations that are generated by translate logic 30 of FIG. 2, and are sent down the floating point pipeline in two successive clock periods, when there are no pipeline stalls.

The exchange instruction "FXCH ST, ST3" is processed by generating two "flows" down the floating point pipeline. Each flow performs a register move where a register's contents are copied into another register. The first move flow, fove1 ST3, ST, copies the contents of stack-top register ST to the third register from the top, ST3. Thus the datum "A" from ST register is copied to register ST3, as shown. The second move flow, fmove2 ST, ST3, copies the contents of third register from the top ST3, to the stack-top register ST. Thus the datum "D" from ST3 register is copied to register ST, as shown.

It would first appear that the second fmove flow would read datum "A" rather than datum "D" from register ST3, since "A" over-writes "D" in ST3 by the first flow fmove1. However, as noted above, both flows read their registers before either flow write a register. Because a pipeline processes these flows, each flow is processed over several clock periods. FIG. 3B is a diagram for a 6-stage pipeline that reads registers in first stage F0 and writes registers in last stage F5. The register is first read by the first flow fovea during clock 1, then fovea advances down the pipeline to the next stage F1 while the second flow fmove2 reads the registers during clock 2. After several more clock periods, at clock 6, the first flow reaches the end of the pipeline and writes the register. Then in the next clock (7) period the second flow fmove2 advances to the final pipeline stage and writes its register.

Thus register ST3 is read by second flow fmove2 during clock 2, but ST3 is not written by the preceding first flow fmove1 until clock 6. Likewise register ST is read by the first flow in clock 1 but not written by the second flow until clock 7. The pipeline acts as a temporary register storing the contents of ST3 and ST during pipeline stages F1, F2, F3, F4, and F5. These contents are physically stored in successive pipestages in data operand or result registers between pipestages. Since these pipeline data registers already must exist for normal floating point operations, no additional temporary registers need be added.

Multiple Rows Only Needed When Pipeline is Under-Utilized

While it is undesirable to process one instruction using multiple flows in the pipeline, this is sometimes necessary for more complex instructions. While the FXCH instruction does not appear complex, it could require an additional temporary register when swapping register contents. Since the floating point registers are wide registers, typically 64 or 80 bits each, this temporary register would likewise be 64 or 80 bits wide, an expensive register. As most programs do not use the floating point processor, it is hard to justify a extra temporary register for the FXCH instruction.

Although two flows are needed by the preferred embodiment to process the FXCH instruction, splitting FXCH into two halves allows one or both halves to be "absorbed" into surrounding floating point instructions. Thus the FXCH may be removed from the pipeline under certain conditions. Half or the entire FXCH instruction is removed during intense back-to-back instruction processing by eliminating the need for one or more move flows. When two flows are initiated for FXCH, usually little or no floating point processing is occurring, and the pipeline would otherwise be idle. Thus the two flows do not necessarily slow down other floating point instructions, as none may be present. Thus the invention executes FXCH with two flows in an otherwise idle pipeline, but merges the FXCH with surrounding instructions when the pipeline is heavily used.

TWO HALVES OF FXCH MERGED WITH SURROUNDING INSTRUCTIONS

FIG. 4A shows a stack-exchange instruction FXCH sandwiched between two floating point add instructions FADD. As described for FIG. 3A, four stack registers ST, ST1, ST2, ST3 initially store data "A", "B", "C", and "D". The first FADD adds "A" and "B" from registers ST and ST1, and stores the sum "I" back to ST. The following FXCH instruction swaps the contents of registers ST and ST3 so that "I" is now in register ST3 while "D" is moved to stack-top register ST. The final FADD adds "D" and "B" from registers ST and ST2, with their sum "J" stored back to register ST, over-writing "D".

While FIG. 4A uses the normal 2-operand stack notation, FOP ST, STX, where Fop is the instruction name, ST, the stack top, is both the first source operand and the destination of the result, and STX is the second operand. FIG. 4B shows a translation to 3-operand notation for the operations of FIG. 4A, with the first operand ST now appearing twice as the destination and the first source. The generic format for 3-operands is "Fop dst, src1, src2". Thus the operand translation from 2-operand to 3-operand format is simple: repeat the first source operand, ST, as the destination as well as the first source. Thus "FADD ST, ST3" becomes "FADD ST, ST, ST3". For FXCH, only one source operand is needed, so SRC1 is set to "0".

FXCH Deleted by Translating Operands of Surrounding Instructions

FIG. 4C shows that the FXCH exchange instruction can be deleted by translating the operands of the surrounding instructions. The destination operand of the first FADD has been translated from ST to ST3. Also, the first source operand of the second FADD has also been translated from ST to ST3. Otherwise, these FADD instructions operate normally, with one exception.

Just as the two flows fmove1 and fmove2 of FIGS. 3A, 3B must read the registers before being over-written, so must the two FADDs of FIG. 4C. The second FADD must read "D" from register ST3 before the first FADD writes "I" to register ST3. In normal processing a data dependency would be detected, since register ST3 is read by the second FADD after being written by the first FADD. The second FADD would, in normal processing, want to read the value written to ST3 by the first FADD. However, this ST3 data dependency was created by translating the operands to eliminate the FXCH. Thus a true data dependency does not exist.

For normal data dependencies, pipeline control logic would stall the second FADD until the first FADD completes and writes to register ST3. Then the second FADD could read ST3 and continue. Bypassing hardware may also be added to send ST3 to the second instruction more quickly. However, since this is an artificial data dependency, the stall or bypass is not needed and is simply disabled.

Once the stall and bypass is disabled, the back-to-back FADD instructions of FIG. 4C will both read their source register before any destination register is written. Both FADDs read their registers first in an early stage of the pipeline, and then several clock periods pass before the first FADD reaches the last pipeline stage and writes to ST3. On the following clock the second FADD writes ST. The timing described and shown in the pipeline flow diagram of FIG. 3B will be followed, except that fmove1 and fmove2 are replaced with the first and second FADD.

Because a pipeline is used, and the two FADDs are back-to-back, the second FADD will read the original contents "D" of register ST3, as the first FADD will not yet have written 'T' to register ST3. The two FADD instructions are processed at the same time by different stages of the pipeline, allowing both reads to occur before the registers are over-written.

Translating the operands of the surrounding FADD operations is equivalent to performing the two halves of the FXCH operation. Once FXCH is split up into the two halves, fmove1 and fmove2, then either or both halves may be merged into a surrounding instruction by translating the operand for that instruction.

Translating the first FADD's destination from ST to ST3 effectively performs FXCH's first flow fmove1 operation: fmove2 ST3, ST, as shown for FIG. 3A. The result of the first FADD would normally be written to ST, but is instead diverted to ST3. Thus the translation of the first FADD's destination accomplishes the move from ST->ST3. Since ST will be over-written by the second FADD, there is no need to copy the first FADD's result to ST, as it will be immediately over-written. The only time it might be necessary to copy the result to ST would be if an exception occurred and processing was halted after the first FADD but before the second FADD. This may be prevented because exceptions may be disabled when the FXCH instruction is being processed. The processor can simply report the exception after the FXCH instruction or after any FADD's that execute part of the exchange instruction. Thus exceptions will not be allowed between the FADD and FXCH instructions. Since these instructions only access registers, common exceptions such as page faults to memory cannot occur. Floating point exceptions can easily be disabled by the floating point status register. Another way to handle exceptions is to undo the translation once the exception is detected.

Likewise, translating the second FADD's source from ST to ST3 effectively performs the fmove2 operation: fmove2 ST, ST3. The second FADD reads directly from ST3, rather than from ST. Thus the translation of the second FADD's source accomplishes the move from ST3->ST. Since ST will be over-written by the second FADD, there is no need to copy the source from ST3 to ST, as it will be immediately over-written.

Thus the second FADD, by reading from ST3 rather than ST, accomplishes the second flow fmove2 of the FXCH instruction.

This simple yet powerful technique of translating an operand or destination can thus perform the work of the FXCH instruction. One half of the FXCH move is performed by translating the instruction preceding the FXCH, while the other half of the FXCH move is performed by translating the instruction following the FXCH instruction.

HALF OF FXCH ABSORBED WHEN ONLY ONE ADJACENT INSTRUCTION

When the FXCH instruction is not surrounded by both a preceding and a following instruction, the exchange operation must still be performed. When there are no instructions surrounding FXCH, then the FXCH operation must be performed alone. The two pipeline flows, fmove1 and fmove2, are dispatched down the floating point pipeline on successive clock cycles, as shown and described above for FIGS. 3A and 3B. Thus an exchange instruction in isolation will be processed by inserting two move flows into the pipeline.

When there is just one adjacent instruction that can absorb half of the exchange, then the other half of the exchange must be processed by inserting into the pipeline the fmove flow for the other half of the exchange. Thus just one flow is inserted for FXCH in this situation.

Case 1—Half of FXCH Absorbed by Preceding Instruction

FIG. 5A shows a flow being inserted into the pipeline when half of the FXCH is absorbed by translating the destination of a preceding instruction. The first FADD instruction is immediately followed by a FXCH ST, ST3 instruction (not explicitly shown). Then a bubble or gap occurs in the pipeline where no floating point instructions are being processed. After the gap, another FADD instruction occurs. Because of the gap, the second instruction cannot absorb the second half of the FXCH.

This gap prevents the second FADD from absorbing the second half of the FXCH when enough clocks have passed by that the first FADD has over-written register ST3 before the second FADD reads register ST3. The exact number of clocks depends on the pipeline, but in the preferred embodiment is set to just one clock to simplify control logic.

The first FADD absorbs the first half of the FXCH, shown as fmove1 back in FIG. 3A, by translating its destination from ST to ST3. Translating the destination accomplishes the effect of a move from ST to ST3. Thus a flow does not have to be introduced into the pipeline for fmove1.

However, there is no instruction immediately following the FXCH. Thus there is no instruction to absorb the second half of the FXCH. While fmove1 has been absorbed by the first FADD preceding the FXCH, the fmove2 flow has not been absorbed. The fmove2 flow must be inserted into the pipeline after the first FADD to complete the second half of the FXCH. The fmove2 flow copies the contents of register ST3 to register ST, completing the second half of FXCH.

Thus the first FADD adds "A" to "B" and writes the sum "T" to register ST3. However, the FXCH requires that the original contents of ST3 be copied to register ST. Since the fmove2 flow occurs immediately after the first FADD, fmove2 reads ST3 early in the pipeline before the preceding FADD over-writes ST3 late in the pipeline. Flow fmove2 reads "D" from register ST3 and then writes "D" back to register ST after the first FADD has written sum 'T' to ST3. Thus the FXCH ST, ST3 is accomplished by only one flow rather than two flows, since the first flow is absorbed by translating the destination of the first FADD instruction.

The second FADD of FIG. 5A must wait until fmove2 has written "D" into register ST. Depending upon the number of clocks in the gap between fmove2 and the second 30 FADD, the second FADD may need to stall before reading ST. Additional logic may be used to reduce or eliminate this stall, but is not deemed cost-effective for the preferred embodiment. The stall can be reduced by canceling the fmove flow after it has been inserted into the pipeline. Cancellation logic would detect a new instruction that does not immediately follow FXCH but uses the register to be written by the fmove flow. If this new instruction reaches the translator circuit before the fmove flow completes and writes its register, it would have to stall for fmove to write its register. The cancellation logic can detect this data dependency and cancel the fmove flow before its writes the register, allowing the new instruction to continue without stalling. Of course, the new instruction would now have its source translated, as was the case for the instruction immediately following FXCH.

Case 2—Half of FXCH Absorbed by Following Instruction

FIG. 5B shows a flow being inserted into the pipeline when half of the FXCH is absorbed by translating the first source of an instruction following FXCH. The first FADD instruction is not immediately followed by a FXCH instruction (not explicitly shown). This first FADD does not translate its destination or source. A bubble or gap occurs in the pipeline after the first FADD where no floating point instructions are being processed. After the gap, the FXCH instruction is immediately followed by another (second) FADD instruction.

Because of the gap, the first FADD instruction cannot absorb the first half of the FXCH. This gap prevents the first FADD from absorbing the first half of the FXCH when enough clocks have passed by that the first FADD has over-written register ST before the fmove1 flow of the FXCH reads register ST. The exact number of clocks depends on the pipeline, but in the preferred embodiment is set to just one clock to simplify control logic.

The FXCH and the second FADD of FIG. 5B must wait until the first FADD has written sum "T" into register ST. Depending upon the number of clocks in the gap between fmove1 and the first FADD, the FXCH's fmove1 may need to stall before reading ST. Additional logic may be used to reduce this stall, but is not deemed cost-effective for the preferred embodiment.

The second FADD absorbs the second half of the FXCH, shown as fmove2 back in FIG. 3A, by translating the second FADD's source from ST to ST3. Translating the source accomplishes the effect of a move from ST3 to ST. Thus a flow does not have to be introduced into the pipeline for fmove2.

However, there is no instruction immediately preceding the FXCH. Thus there is no instruction to absorb the first half of the FXCH. While fmove2 has been absorbed by the second FADD following the FXCH, the fmove1 flow has not been absorbed. The fmove1 flow must be inserted into the pipeline after the gap when the FXCH is encountered to accomplish the first half of the FXCH. The fmove1 flow copies the contents of register ST to register ST3, accomplishing the first half of FXCH.

Thus the first FADD of FIG. 5B adds "A" to "B" and writes the sum "T" to register ST. However, the gap that follows prevents the first fmove1 flow from being absorbed into the first FADD. FXCH requires that the original contents of ST be copied to register ST3. Since the fmove1 flow immediately precedes the second FADD, the second FADD reads ST3 early in the pipeline before fmove1 over-writes ST3 late in the pipeline. Flow fmove1 reads "T" from register ST and writes "T" back to register ST3 before the second FADD has written sum "J" to ST. Thus the FXCH ST, ST3 is accomplished by only one flow rather than two flows, since the second flow is absorbed by translating the source of the second FADD instruction that follows the FXCH.

Rules of Translation

The rules for absorbing the two halves fmove1, fmove2 of the exchange instruction FXCH ST, STx by operand translation of surrounding floating point instructions are:

(1) If a FXCH ST. STx is ready for processing in the current clock cycle then:
  (a) If there is no floating point instruction immediately preceding the FXCH, then insert flow fmove1 ST, STx into the floating point pipeline.
  (b) If there is a floating point instruction immediately preceding the FXCH, then translate the floating point instruction's destination to STx.

(2) If step (1) occurred in the last clock cycle, then:
  (a) If there is no floating point instruction in this clock immediately following the FXCH ST, STx, then insert flow fmove2 STx, ST into the floating point pipeline.
  (b) If there is a floating point instruction in this clock immediately following FXCH ST, STx, then translate the floating point instruction's first source to STx.

These rules are implemented by the translator circuit 30 of FIG. 2, which is described in more detail in the following sections.

PIPELINE ARCHITECTURE

Figure 6:
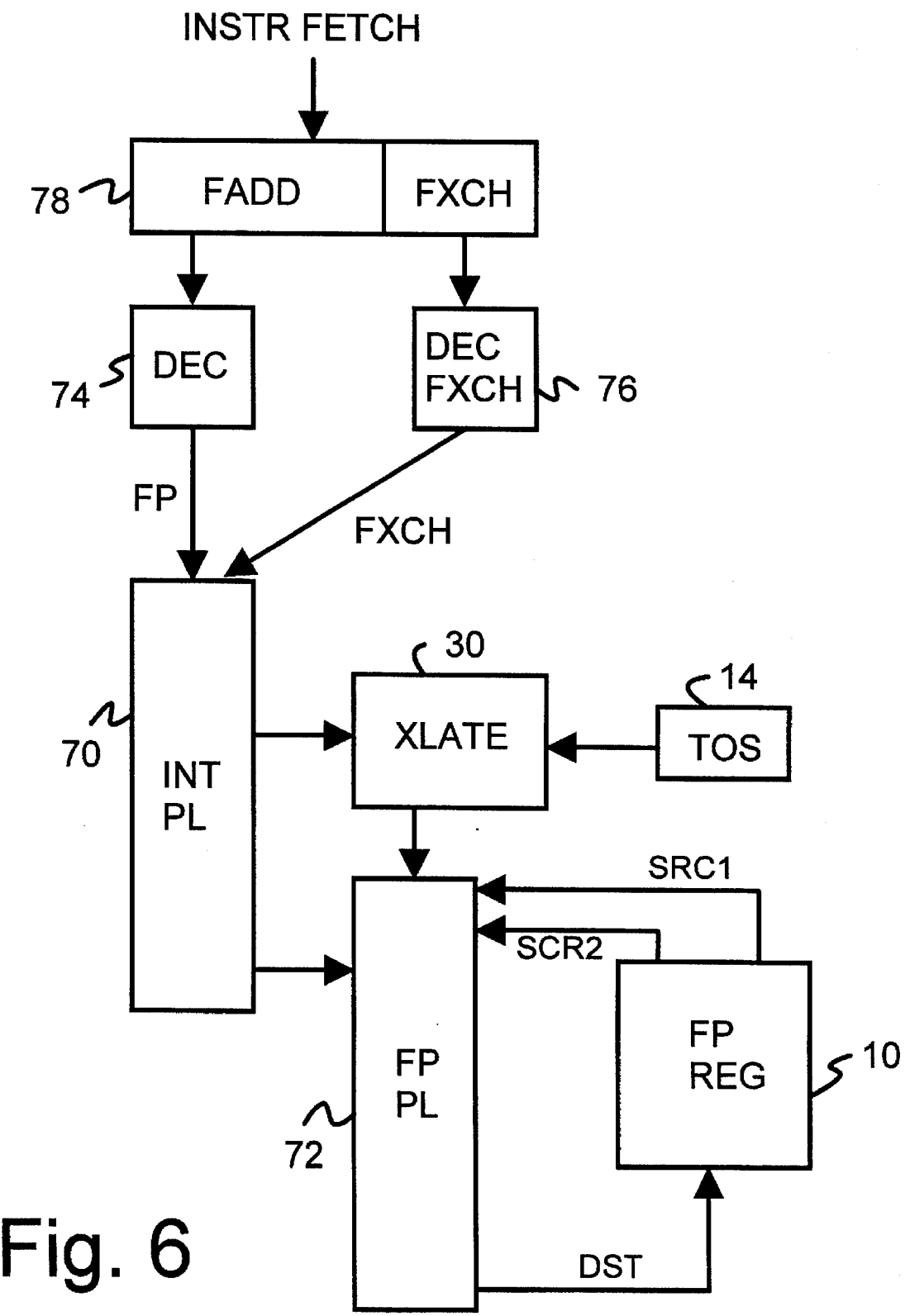
FIG. 6 is a block diagram of a processor with an integer and a floating point pipeline with operand translation.

FIG. 6 is a block diagram of a processor with an integer and a floating point pipeline with operand translation. An instruction fetcher loads instruction register 78 with a next instruction to be decoded. This instruction, such as floating point add FADD, is decoded by decoder 74. An additional two bytes of the instruction stream are also fetched into instruction register 78, and these two additional bytes are decoded by FXCH decoder 76 to determine if these two additional bytes contain a floating point exchange instruction FXCH. If these two bytes do not contain FXCH, then they are ignored and will be decoded on the next clock cycle.

FXCH decoder 78 is a small instruction decoder only able to decode a single instruction, FXCH. However, decoder 74 is a full instruction decoder, able to decode substantially all instructions that are directly supported by the processor. Decoder 74 may thus also decode FXCH when FXCH appears as the first instruction in instruction register 78. However, in that case FXCH decoder 76 will be disabled from decoding a second FXCH in the same clock cycle.

A decoded instruction from decoder 74 is sent to integer pipeline 70 each clock cycle that the pipeline 70 is not stalled. The decoded instruction from decoder 74 may include any floating point instruction or any integer (non-floating point) instruction. Sometimes a FXCH instruction will immediately follow a floating point instruction decoded by decoder 74. In that case, the FXCH immediately following the floating point instruction will be decoded by FXCH decoder 76 and also sent to integer pipeline 70 during the same clock cycle that the floating point instruction is sent to integer pipeline 70. Thus integer pipeline 70, which normally can accept only one instruction per clock cycle, will accept a second instruction in a clock cycle when that second instruction is FXCH. A limited type of super-scalar operation is thus supported by integer pipeline 70.

Integer pipeline 70 contains an arithmetic-logic-unit (ALU) for processing integer arithmetic. Integer pipeline 70 is not able to perform floating point arithmetic. Thus floating point instructions in integer pipeline 70 must be transferred to floating point pipeline 72. However, some floating point instructions may need resources in integer pipeline 70, such as memory access or stack-top pointer increment or decrement to modify the TOS pointer. Thus all floating point instructions initially flow through part or all of integer pipeline 70 before being transferred to floating point pipeline 72.

Floating point pipeline 72 receives floating point instructions from integer pipeline 72 either directly, or after operand specifiers are translated by translator circuit 30. Translator circuit 30 receives the top-of-stack pointer TOS from pointer register 14. The TOS pointer identifies one of the eight floating point registers in data registers 10 as the top of the LIFO stack. Translator circuit 30 uses the stack-top pointer from pointer register 14 and an operand source specifier for the floating point instruction decoded by decoder 74 to generate specifiers or select signals for two source registers, SRC1, SRC2 in data registers 10. These two source registers are read near the beginning of floating point pipeline 72. A destination specifier DST is also generated by translation circuit 30, which is used to select one of the eight registers in data registers 10 as the destination for the floating point operation's result. This result is written to data registers 10 near the end of floating point pipeline 72.

Translate circuit 30 can also receive an exchange source specifier from FXCH decoder 76 when a second instruction was FXCH. Translator circuit 30 uses the exchange source specifier to further translate the SRC1, SRC2, and DST specifiers to accomplish the register exchange action that the FXCH instruction requires. Thus the FXCH can be removed from further execution by translate circuit 30 as the floating point instruction is loaded into floating point pipeline 72. While integer pipeline 70 can carry along a second instruction, FXCH, in each stage, floating point pipeline 72 can have just one floating point instruction per stage. If the FXCH cannot be removed by translation of surrounding instructions, then FXCH must be sent down floating point pipeline 72 alone without any other instructions in the stage containing FXCH. FXCH must be sent down alone, even if other floating point instructions must be stalled to make room for FXCH.

Integer Pipeline Control Word May Encode an Additional FXCH

Figure 7:
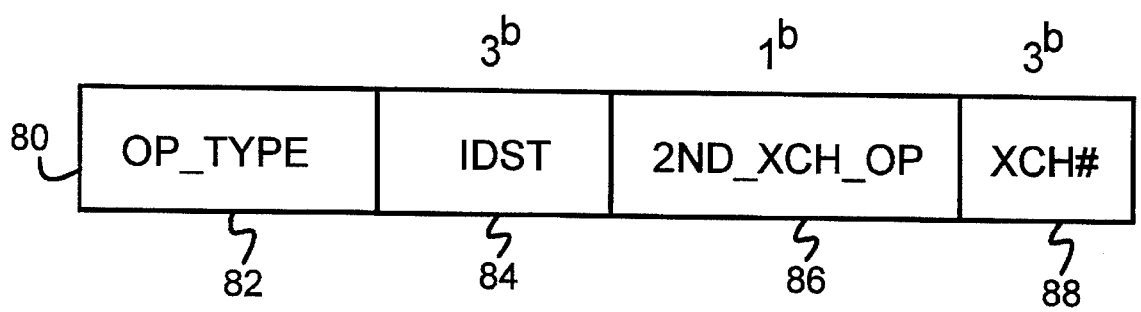
FIG. 7 is a control word for the integer pipeline, where the control word can encode an additional FXCH instruction.

FIG. 7 is a control word for the integer pipeline, where the control word can encode an additional FXCH instruction. Integer pipeline control word 80 is partially generated by decoder 74 of FIG. 6, which loads fields 82, 84. Field 82 contains an encoding for the type of operation to be performed, such as FADD. Many bits may be required for field 82, since these bits control the hardware in the pipelines. Integer destination field 84 is a 3-bit field which ordinarily contains a register number where the result from the integer operation will be written. However, for stack-based floating point instructions, the destination is always the stack-top. Thus there is no need to encode the destination for stack instructions. However, the second source of these stack operations can be encoded and stored into this destination field 84. The 3-bit number stored is not the actual register number, but is the relative position of the source register to the stack-top. Since the integer registers are read near the beginning of integer pipeline 70, the integer source fields are not transferred all the way down integer pipeline 70; only the integer destination is.

The other two fields 86, 88 are loaded by the FXCH decoder 76 when a second instruction decoded in a clock cycle is FXCH. A single bit in field 86 can be used to indicate that the second FXCH is being absorbed into or piggy-backed onto the main instruction encoded in field 82. When the second instruction in the cycle is not FXCH, or when the first instruction is FXCH and is encoded into field 82, then this bit in field 86 is cleared to zero. Field 88 is loaded with a 3-bit stack-top-relative position for the exchange source, when the second instruction is FXCH. When the first instruction is FXCH, then field 82 is loaded with the exchange source. Field 86 may be eliminated by using the encoding "000" in field 88 to indicate no FXCH. Field 88 contains the 3-bit stack-top-relative position for the exchange source. An encoding of "000" would be swap between ST and ST(0), which is ST. Thus the encoding "000" indicates no exchange.

PIPELINE TIMING

Figure 8:
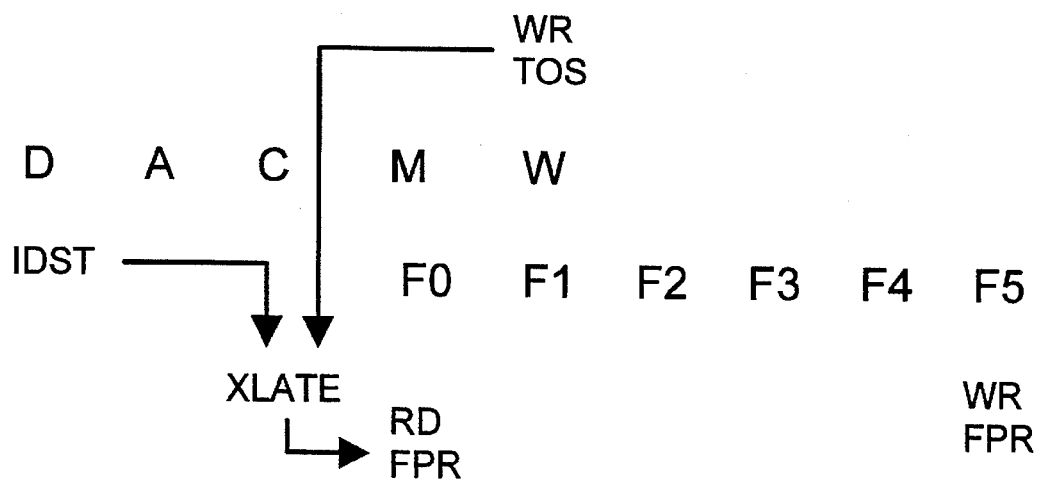
FIG. 8 is a pipeline timing diagram showing the translate circuit operating immediately before the floating point registers are read.

FIG. 8 is a pipeline timing diagram showing the translate circuit operating immediately before the floating point registers are read. The integer pipeline 70 contains stages D, A, C, M, and W, for decode, address generate, cache access, memory access/execute, and write-back. The floating point pipeline 72 starts when the integer pipeline 70 is in stage M, and continues past the last stage (W) of integer pipeline 70. Floating point pipeline 72 contains six stages—F0, F1, F2, F3, F4, and F5. The floating point data registers are read during stage F0, when the integer pipeline is in stage M, and these floating point data registers are written with the result calculated in stages F1–F4 during the last stage F5.

The integer destination field 84 is generated by the decoder during stage D, and is staged down the integer pipeline. At stage C the translator circuit 30 read this integer destination field 84, and also other fields in pipeline control word 80 which has also been staged down the integer pipeline. The stack-top pointer is written during stage W, and is read by translate circuit 30 two stages earlier in stage C. If an instruction in the intervening stage M modifies the stack-top, then the stack-top must be adjusted before being sent to translator circuit 30, or the translator circuit 30 must stall one clock until TOS is updated. Translate circuit 30 generates the source register selects for the read of the floating point data registers in stage F0, which occurs in stage M of the integer pipeline, immediately after the translator circuit translates the operand specifiers. Translate circuit 30 also generates the destination register specifier, which is staged down the floating point pipeline until stage F5, where the result is written to the register selected by the destination register specifier.

OPERAND TRANSLATOR CIRCUIT

Figure 9:
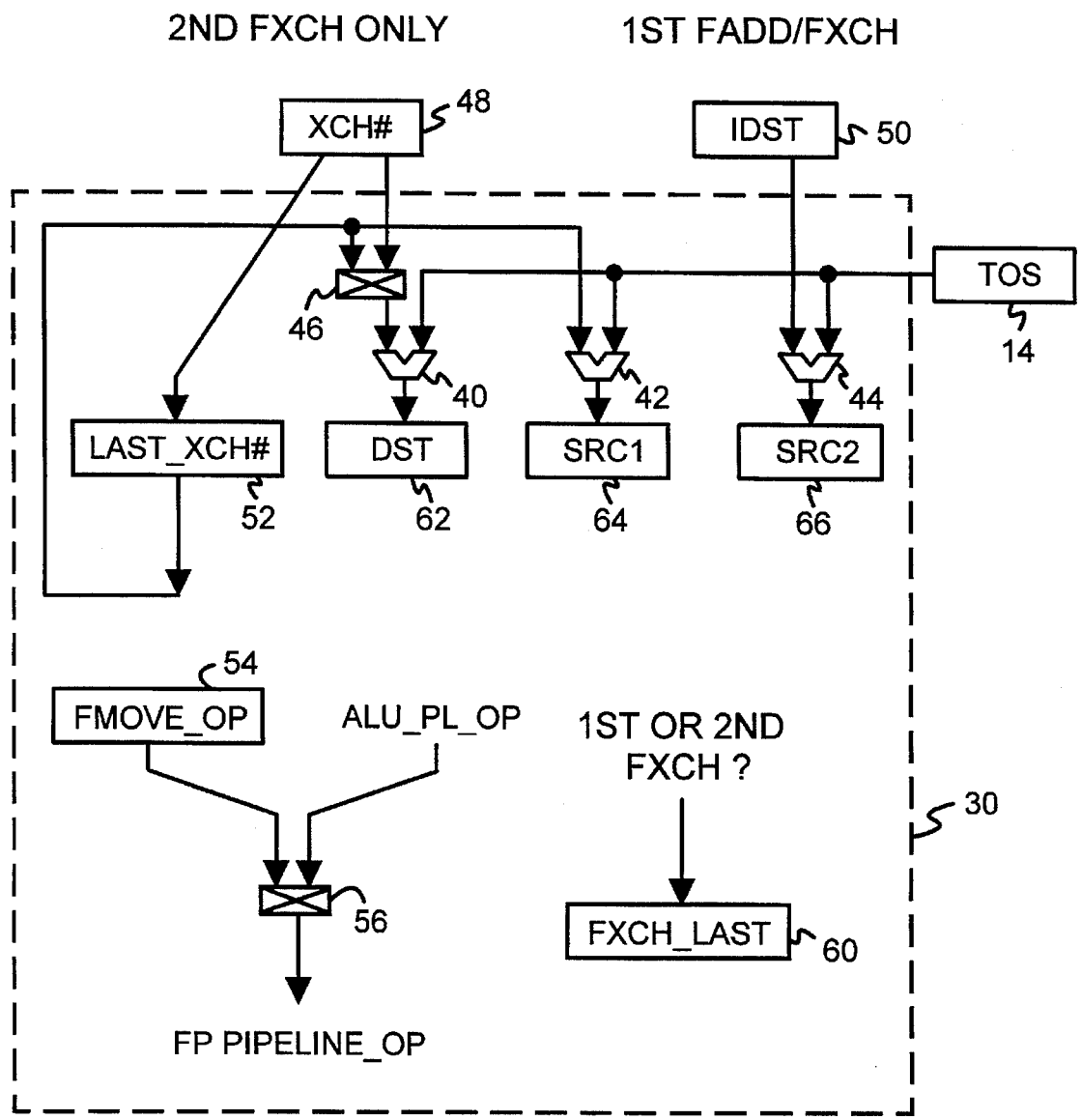
FIG. 9 is a block diagram for a translator circuit for absorbing exchange instructions by translating operands.

FIG. 9 is a block diagram for a translator circuit for absorbing exchange instructions by translating operands. Translator circuit 30 acts as an interface between integer pipeline 70 and floating-point pipeline 72 of FIG. 6. Stack-based operands from integer pipeline 70 are translated to the 3 operands DST, SRC1, SRC2 for accessing the floating point data registers with floating point pipeline 72.

The integer pipeline control word 80 (FIG. 7) is received from integer pipeline 70. Integer destination field IDST 84 is loaded into IDST register 50. For floating point stack operations, this integer destination register 50 is loaded with the second source, rather than the destination, since the destination and first source are always the stack top ST. Integer destination register 50 is loaded with a 3-bit binary number that is a relative position to the stack top for the source register, one of the eight floating point data registers. Translator circuit 30 also receives the top-of-stack pointer TOS from pointer register 14.

When a floating point exchange instruction FXCH immediately follows the first floating point instruction ("1st FADD"), the instruction decoder is able to piggy-back this FXCH onto the first FADD's integer pipeline flow. Since the FXCH is simple, a single bit can be added to the pipeline control word for FADD to indicate that a FXCH is piggy-backed. Also, the source register's position for the exchange is added to FADD's pipeline control word. See the explanation for FIG. 7.

The exchange's source register is also a 3-bit binary number that is the relative position of the exchange's source register to the stack top. The exchange instruction's source is staged down the integer pipeline in field 88 of control word 80 with the FADD and loaded into exchange source register 48. Thus the FADD and the FXCH occupy one stage in the integer pipeline, even though the integer pipeline can normally only contain one instruction for each stage. A limited form of superscalar operation is possible since two instructions are combined together by the integer pipeline's decode or dispatch unit. This superscalar operation is limited since only FXCH may be combined with other floating point instructions.

Translation circuit 30 uses the top-of-stack pointer TOS from pointer register 14 to translate the stack operand specified in IDST register 50 to an absolute register number that selects one of the eight floating point data registers. This absolute register number is stored into second source register SRC2 66. Likewise the exchange source in register 48 and the top-of-stack pointer TOS from pointer register 14 are used to generate the first source and the destination, SRC1, DST that are stored in registers 64, 62. The three registers 62, 64, 66, contain the destination DST and sources SRC1, SRC2 respectively, which are sent to floating point pipeline 72 so that the floating point data register may be accessed and updated.

These translations are accomplished by adding the stack-top pointer TOS from pointer register 14 to the relative positions from control word 80 from integer pipeline 70. These relative positions are stored in registers 50, 48 for the first instruction and the second instruction which can only be FXCH. Adders 40, 42, 44 are 3-bit adders that add in modulo eight, the number of floating point data registers in the stack. The second source, SRC2, is generated by adding the TOS to the relative position of the second source's register, stored in IDST register 50. Adder 44's sum is loaded into register 66 as SRC2. The destination DST and the first source SRC1 are normally the stack-top ST, so adders 40, 42 normally add zero to TOS from pointer register 14. A 3-bit zero is input to the left inputs of adders 40, 42 by zeroing circuitry in adders 40, 42, or other equivalent logic (not shown).

If a FXCH instruction is either the first or second instruction in one clock cycle, register 60 will be set to remember that FXCH occurred in the last cycle. Since the first half of the FXCH will have been accomplished, either by translating the first instruction's destination, or by initiating a fmove1 flow, the second half of the FXCH must be processed in the next clock cycle. Register 60 is used to indicate that the second half of FXCH is pending. The exchange source position from register 48 is written to register 52 so that the FXCH's source register is also remembered for the second half in the next clock cycle. This exchange source will be needed to translate the following floating point instruction's first source, or to initiate the fmove2 flow.

The control word 80 from the integer pipeline is muxed to the floating point pipeline by mux 56, unless a fmove flow is initiated. In that case a fmove operation control word for the floating point pipeline is generated by register 54 and muxed to the floating point pipeline by mux 56.

Operation of Translator Circuit-Isolated FXCH

Figure 10:
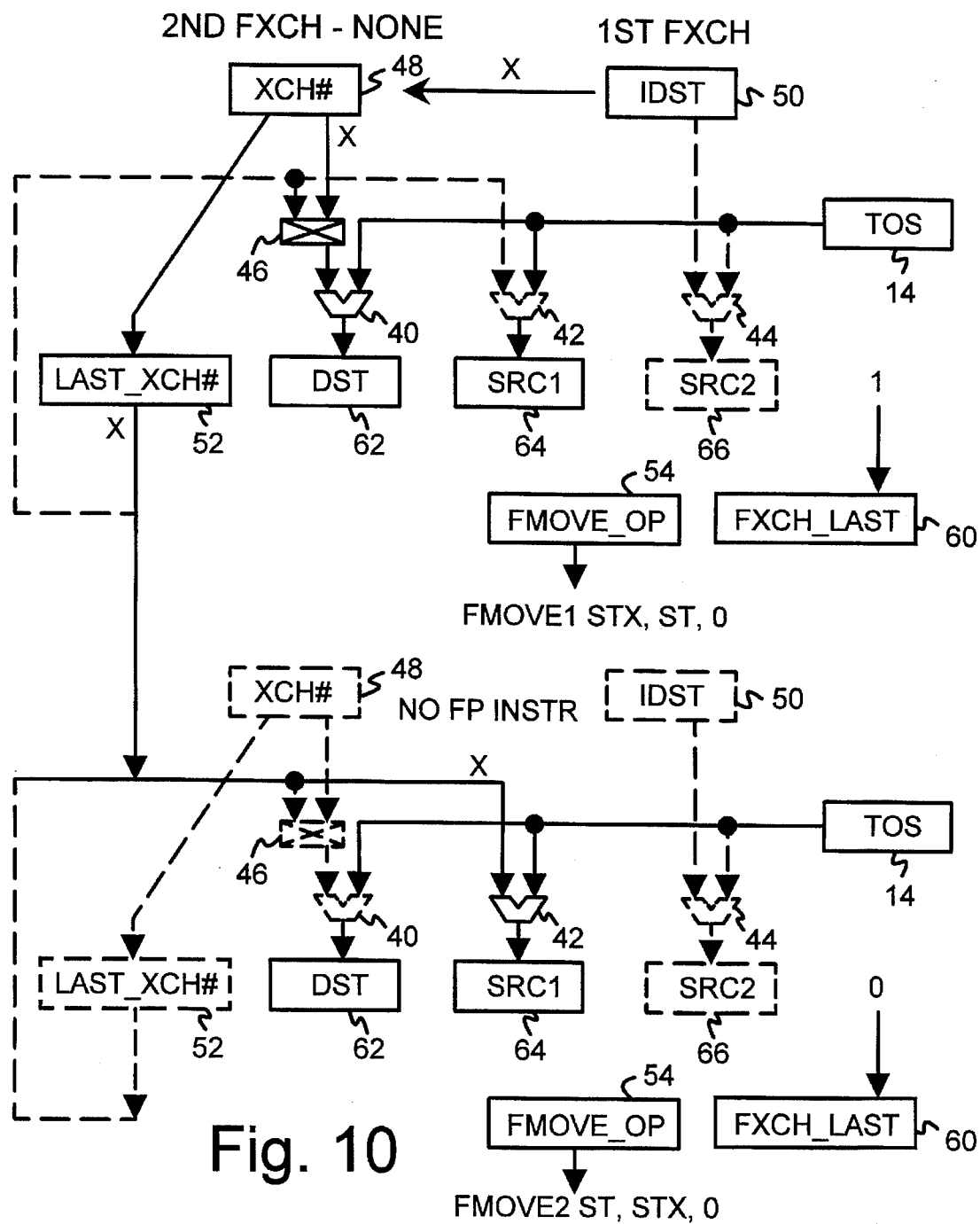
FIG. 10 is a diagram showing how the translator circuit is used to process a FXCH instruction that has no adjacent floating point instructions that can absorb half of the register exchange by translation.

FIG. 10 is a diagram showing how translator circuit 30 is used to process a FXCH instruction that has no adjacent floating point instructions that can absorb half of the register exchange by translation. FIG. 3A showed this case, when two pipeline flows must be inserted into floating point pipeline 72. The first flow, fmove1, copies ST to ST3, while the second flow, fmove2, copies ST3 to ST. Since these flows are back-to-back, the pipeline acts as a temporary register ensuring that data is not overwritten before being read.

The upper half of FIG. 10 shows part of translator circuit 30 during a first clock period when FXCH is received from integer pipeline 70. Fmove1 is initiated in this first clock period, as shown by register 54. The lower half of FIG. 10 shows part of translator circuit 30 during a second clock period after FXCH is received. Fmove2 is initiated in this second clock period, as shown by register 54 in the lower half. Thus the circuitry of translator circuit 30 is shown twice in FIG. 10, once for each clock period. Dashed lines are used to indicate signal lines or circuitry that are effectivly not being used in that clock period.

In the first clock period, fmove1 STX, ST, 0 is generated by loading TOS to SRC1 register 64, while SRC2 is loaded with zero and DST register 62 is loaded with the sum of TOS and the exchange position X from register 48. Since the only instruction is FXCH, IDST register 50 is loaded with FXCH's relative source position, designated as "X". This value "X" from register 50 must be copied over to register 48, either by translator circuit 30, or by the decoder 74 or integer pipeline 70. Mux 46 is used to send "X" from register 48 to adder 40. The exchange source from register 48 is loaded into register 52 for use in the next clock period, and register 60 is set to indicate that the second half of FXCH is pending for the next clock period.

In the next clock period, shown in the lower half of FIG. 10, flow fmove2 ST, STX, 0 is inserted into floating point pipeline 72. Register 54 generates the proper control word, while registers 62, 64 hold the register specifiers for the destination and first source. The destination DST is simply the stack top register, so TOS is loaded into register 62, with adder 40 being disabled by having its left input set to zero. The first source is STX, which is the sum of the relative position of the exchange source from register 52, and TOS. Register 60 is cleared to indicate that FXCH is no longer pending.

Operation of Translator Circuit-FADD, FXCH, FADD Sequence

Figure 11:
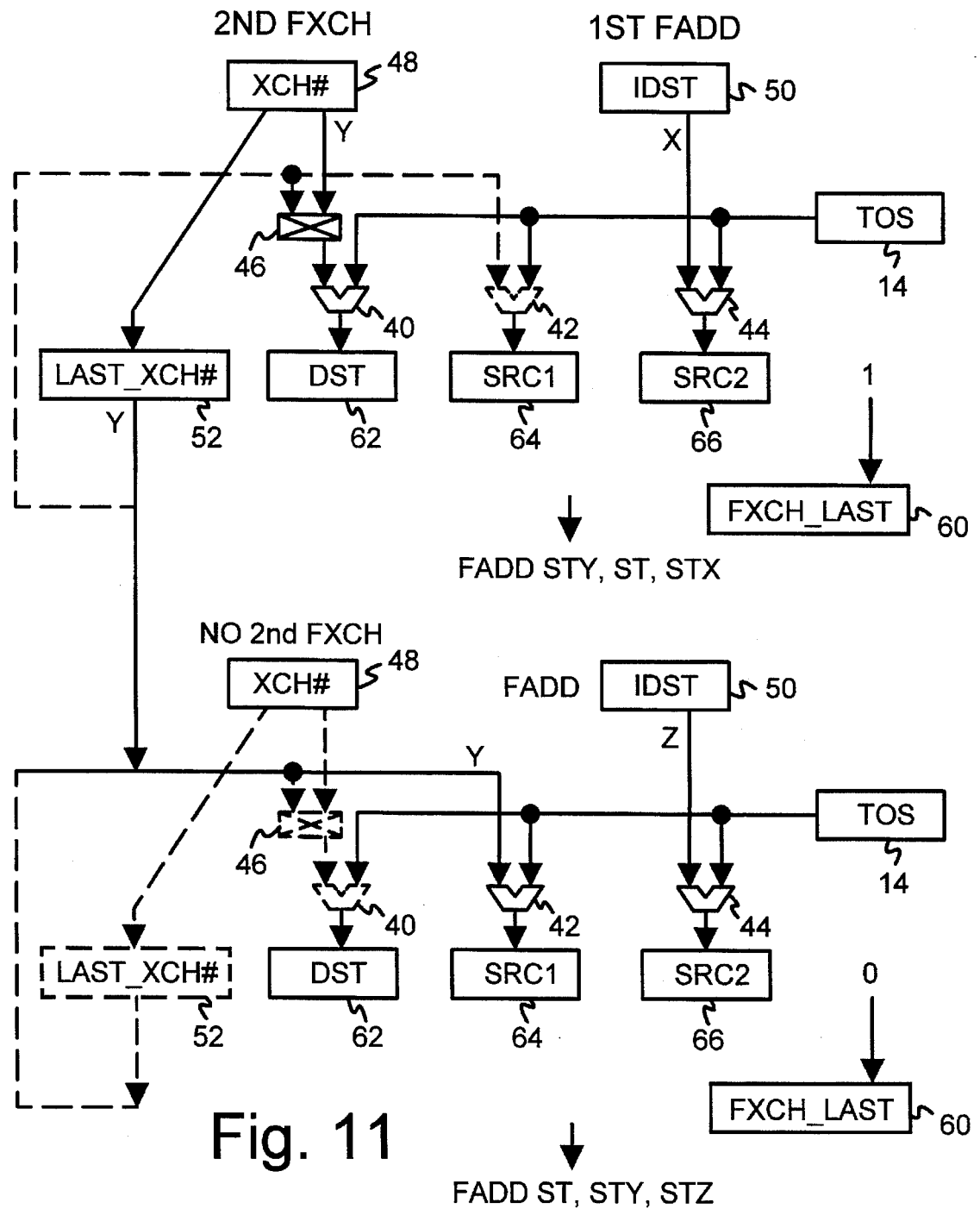
FIG. 11 shows a diagram of how the translator circuit is used to process an FADD, FXCH instruction pair that has a following FADD floating point instruction that absorbs the second half of the register exchange by translation.

FIG. 11 shows a diagram of how translator circuit 30 is used to process an FADD, FXCH instruction pair that has a following FADD floating point instruction that absorbs the second half of the register exchange by translation. FIG. 4C showed this case, when the FXCH is removed from floating point pipeline 72. The first FADD has its destination translated, while the second FADD in the next cycle has its first source translated.

The upper half of FIG. 11 shows part of translator circuit 30 during a first clock period when a FADD, FXCH pair is received from integer pipeline 70. The first FADD is translated. The lower half of FIG. 11 shows part of translator circuit 30 during a second clock period after FXCH is received, when another (second) FADD is received. This second FADD has its first source translated. Thus the circuitry of translator circuit 30 is shown twice in FIG. 11 once for each clock period. Dashed lines are used to indicate signal lines or circuitry that is not being used in that clock period.

In the first clock period, FADD STY, ST, STX is generated by loading TOS to SRC1 register 64, while SRC2 is loaded with the sum of "X" in IDST register 50 and TOS, and DST register 62 is loaded with the sum of TOS and the exchange position Y from register 48. Mux 46 is used to send "Y" from register 48 to adder 40. The exchange source "Y" from register 48 is loaded into register 52 for use in the next clock period, and register 60 is set to indicate that the second half of FXCH is pending for the next clock period.

In the next clock period, shown in the lower half of FIG. 11, FADD ST, STY, STZ is generated to floating point pipeline 72. Registers 62, 64, 66 hold the register specifiers for the destination and sources. The destination DST is simply the stack top register, so TOS is loaded into register 62, with adder 40 being disabled by having its left input set to zero. The first source is STY, which is the sum of the relative position "Y" of the exchange source from register 52, and TOS. The second source position "Z" from register 50 for the second FADD instruction is added to TOS by adder 44 and loaded into register 66 as SRC2. Register 60 is cleared to indicate that FXCH is no longer pending.

Operation of Translator Circuit-FADD, FXCH, FADD, FXCH Sequence

Figure 12:
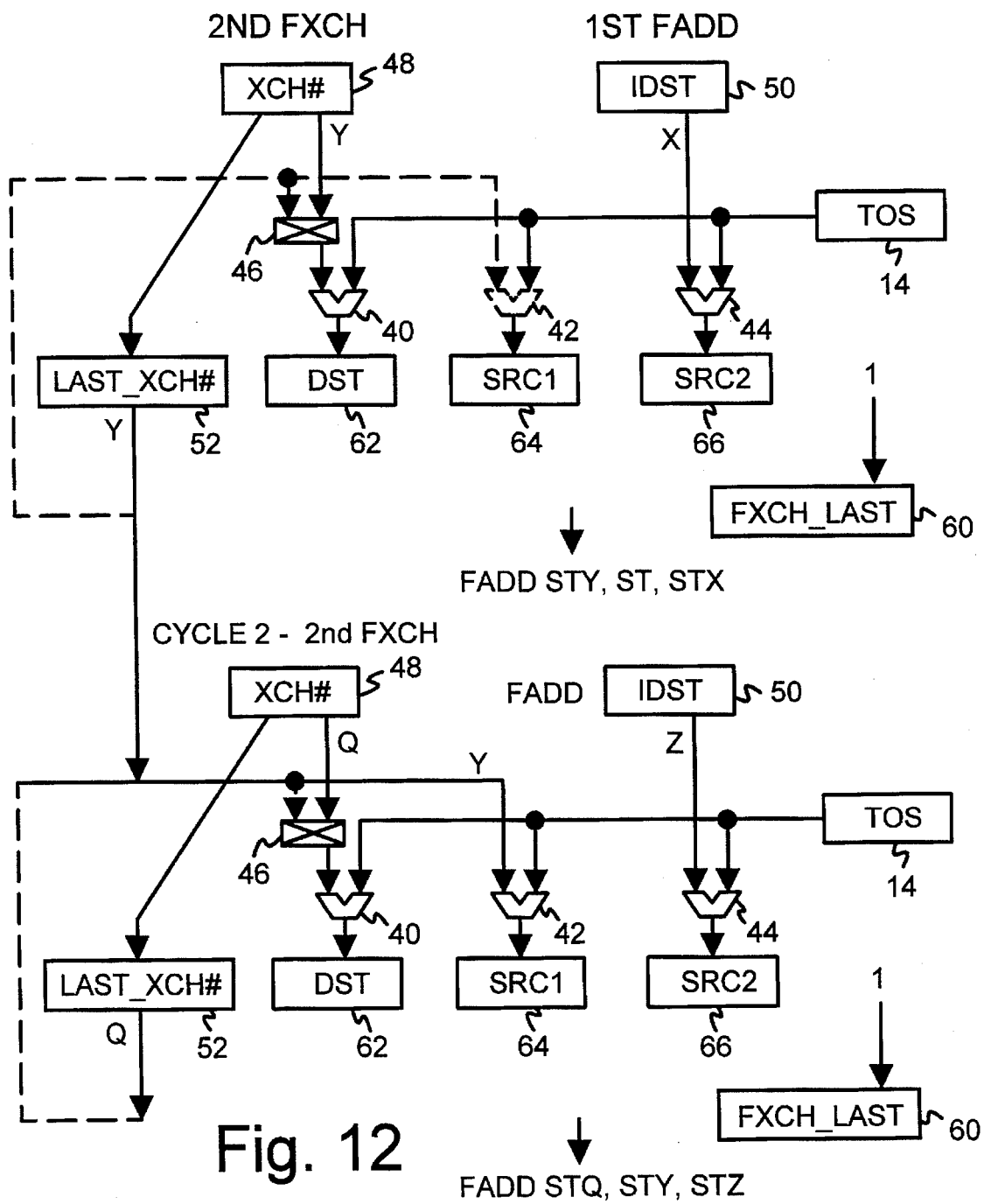
FIG. 12 shows a diagram of how the translator circuit is used to process an FADD, FXCH instruction pair that has a following FADD, FXCH pair that absorb the second half of the register exchange by translation.

FIG. 12 shows a diagram of how translator circuit 30 is used to process an FADD, FXCH instruction pair that has a following FADD, FXCH pair that absorb the second half of the register exchange by translation. The first FXCH is removed from floating point pipeline 72. The first FADD has its destination translated, while the second FADD in the next cycle has both its first source translated by the first FXCH and its destination translated by the second FXCH.

The upper half of FIG. 12 shows part of translator circuit 30 during a first clock period when the first FADD, FXCH pair is received from integer pipeline 70. The first FADD is translated. The lower half of FIG. 12 shows part of translator circuit 30 during a second clock period after FXCH is received, when another (second) FADD, FXCH pair is received. This second FADD has both its first source and destination translated. Thus the circuitry of translator circuit 30 is shown twice in FIG. 12 once for each clock period. Dashed lines are used to indicate signal lines or circuitry that is not being used in that clock period.

In the first clock period, FADD STY, ST, STX is generated by loading TOS to SRC1 register 64, while SRC2 is loaded with the sum of "X" in IDST register 50 and TOS, and DST register 62 is loaded with the sum of TOS and the exchange position Y from register 48. Mux 46 is used to send "Y" from register 48 to adder 40. The exchange source "Y" from register 48 is loaded into register 52 for use in the next clock period, and register 60 is set to indicate that the second half of FXCH is pending for the next clock period.

In the next clock period, shown in the lower half of FIG. 12, FADD STQ, STY, STZ is generated to floating point pipeline 72. Registers 62, 64, 66 hold the register specifiers for the destination and sources. The first source is STY, which is the sum of the relative position "Y" of the exchange source from register 52, and TOS. The second source position "Z" from register 50 for the second FADD instruction is added to TOS by adder 44 and loaded into register 66 as SRC2. Register 60 is cleared to indicate that FXCH is no longer pending.

The first source SRC1 of the second FADD in the lower half of FIG. 12 was translated by the first FXCH of the previous clock period. The first FXCH had an exchange source position of "Y", which was loaded into register 48 and then transferred to register 52. However, the second FXCH has an exchange source position "Q" that is loaded into register 48, over-writing the value "Y" from the first FXCH in the last cycle. The destination DST of the second FADD must also be translated for the second FXCH. Thus the second FADD is translated twice—first SRC1 is translated for the first FXCH, then DST is translated for the second FXCH. This second FADD absorbs half of the exchange operations for two different FXCH instructions. It absorbs the fmove2 flow for the first FXCH, and the fmove1 flow for the second FXCH. The first FXCH immediately precedes the second FADD, while the second FXCH immediately follows the second FADD.

The second FADD's destination is translated for the second FXCH by adding in adder 40 the second FXCH's exchange source "Q" from register 48 to the stack top TOS. The sum is loaded into DST register 62. Mux 46 selects "Q" from register 48 rather than "Y" from register 52.

ADVANTAGES OF THE INVENTION

An advantage of the invention over the pointer-table prior art is apparent when a task switch such as an exception occurs. On a task switch, the floating point register stack must be saved out to memory as the new task could over-write these registers. With the pointer tables, the task-switch software must either unscramble the mapping of the registers by the pointer table, or loads and stores must use the table's mapping so that the registers may be properly saved to memory. With the present invention there is no unscrambling to do. The software simply saves each register to memory, and the top-of-stack pointer. The registers are always stored in their proper order. This simplifies exception processing.

ALTERNATE EMBODIMENTS

Several other embodiments are contemplated by the inventor. For example register 60 is used to indicate that FXCH is or is not pending. However, an exchange source of "000", the stack top ST, could also be used to indicate that no FXCH is pending. Since the encoding of "000" indicates that ST be exchanged with itself, no operation is needed. Thus the exchange-source encoding of "000" for FXCH ST, ST0 can be used to eliminate register 60. Any non-zero value in the exchange-source registers indicates that a FXCH is pending, when the bit in register 60 would be set.

While the floating point operation FADD has been used in these examples, the invention is to be used will most types of floating point operations that use the stack of floating point registers. Floating point subtraction, multiply, divide, compare, moves, and other types of operations may be substituted for FADD in the above examples. The requirement is that the instructions surrounding the FXCH must use the top-of-stack as the destination and/or source operand.

The length, or number of stages or clock periods of a pipeline, is not critical to the invention. A six-stage pipeline has been described, but pipelines as small as three or possibly even two stages could be used. The critical requirement is that the second instruction read the register before the first instruction over-writes the register. An example of a short 3-stage pipeline meeting this requirement is shown below:

| Clocks | 1 | 2 | 3 | 4 |
|---|---|---|---|---|
| FADD | F0 Read ST | F1 | F5 Write ST3 | |
| FADD | | F0 Read ST3 | F1 | F5 Write |

Likewise, it is not critical that the instructions read the registers in the first stage, and write them in the last stage. The read may occur later and the write may occur earlier in the pipeline, as long as the 2nd read and 1st write are separated by a clock, as shown above in the diagram, or additional bypass logic is used.

The fmove2 flow could be canceled after it is inserted into the pipeline, allowing a following floating point instruction to absorb this flow's move by translating its source operand. The exact implementation of such flow canceling depends on the pipeline. For the preferred embodiment, it is not considered worth the extra complexity.

The term "operand" applies in a strict sense to the inputs of an operation, but has sometimes been used herein to refer to both the source operands and the destination. Thus translating instruction operands includes translating the destination as well as the sources. While translation of the first operand of the following instruction and translation of the destination of the preceding instruction have been described, translation may be applied to other sources of the following instruction, or other destinations of the preceding instruction.

The floating point registers contain individual registers that each may contain a binary number in a floating point format. Several formats exist for floating point representation, often with varying number of bits of precision. However, all representations include a mantissa or significant portion and an exponent portion, as is well-known in the art. In a preferred embodiment the 3-bit pointer TOS to the stack-top ST register 12 in data registers 10 stored in top-of-stack pointer register 14 is allowed to wrap around the "111" to "000" boundary, depending upon the push and pop activity.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A processor for processing instructions including an exchange instruction, the exchange instruction for exchanging the contents of an exchange-destination register with the contents of an exchange-source register, the processor comprising:

a translation circuit which comprises:
destination translation means for translating a first destination-register specifier of a preceding instruction which preceds the exchange instruction, the first destination-register specifier being replaced with an exchange-source specifier that specifies a register as the exchange-source register, wherein the preceding instruction writes a result of an operation specified by the preceding instruction to the exchange-source register;
source translation means for translating a second source-register specifier of a following instruction which follows the exchange instruction, the second source-register specifier being replaced with the exchange-source specifier, wherein the following instruction reads the exchange-source register for a source operand; and
means for removing the exchange instruction from further processing by the processor when the destination translation means replaces the first destination-register specifier with the exchange-source specifier and the source translation means replaces the second source-register specifier with the exchange-source specifier, whereby a first half of the exchange instruction is processed by the preceding instruction and a second half of the exchange instruction is processed by the following instruction.

2. The processor of claim 1 further comprising:
first means for inserting a first move flow into a pipeline when the exchange instruction is processed and the destination translation means does not replace the first destination-register specifier with the exchange-source specifier; and
second means for inserting a second move flow into the pipeline when the exchange instruction is processed and the source translation means does not replace the second source-register specifier with the exchange-source specifier,
whereby the exchange instruction is processed by the first and second move flows when the first destination-register specifier and the second source-register specifier are not replaced with the exchange-source specifier.

3. The processor of claim 2 wherein the first move flow is inserted into the pipeline during a first clock cycle and the second move flow is inserted into the pipeline during a second clock cycle, whereby the exchange instruction processed by the first and second move flows requires two clock cycles for insertion into the pipeline.

4. The processor of claim 3 wherein the preceding instruction immediately precedes the exchange instruction and the following instruction immediately follows the exchange instruction, and wherein the following instruction immediately follows the preceding instruction in a next clock cycle when the exchange instruction is removed from further processing.

5. The processor of claim 3 wherein when the following instruction does not immediately follow the exchange instruction the source translation means does not replace the second source-register specifier with the exchange-source specifier, and wherein the second means inserts the second move flow into the pipeline when the exchange instruction is processed;
whereby the first half of the exchange instruction is processed by the preceding instruction but the second half of the exchange instruction is processed by the second move flow and not the following instruction when the following instruction does not immediately follow the exchange instruction.

6. The processor of claim 3 wherein when the preceding instruction does not immediately precede the exchange instruction the destination translation means does not replace the first destination-register specifier with the exchange-source specifier, and wherein the first means inserts the first move flow into the pipeline when the exchange instruction is processed,
whereby the second half of the exchange instruction is processed by the following instruction but the first half of the exchange instruction is processed by the first move flow and not the preceding instruction when the preceding instruction does not immediately precede the exchange instruction.

7. The processor of claim 3 wherein the contents of the exchange-destination register and the contents of the exchange-source register each are binary numbers represented in a floating point format, the floating point format including a mantissa portion and an exponent portion.

8. The processor of claim 7 wherein the pipeline comprises an integer pipeline and a floating point pipeline, and wherein the translation circuit generates register specifiers for the floating point pipeline.

9. The processor of claim 8 wherein the floating point pipeline acts as a temporary register temporarily storing the contents of the exchange-destination register and the contents of the exchange-source register during the processing of the exchange instruction.

10. The processor of claim 7 wherein the exchange-destination register is a register at the top of a stack, and wherein the first destination-register specifier and the second source-register specifier and the exchange-source specifier are positions relative to the top of the stack.

11. The processor of claim 10 further comprising:

top-of-stack pointer register for containing a pointer to a physical register in a bank of physical registers, the pointer identifying one of the physical registers as the register at the top of the stack;

incrementing means for increasing the pointer in response to a pop instruction when an additional result is removed from the stack; and decrementing means for decreasing the pointer in response to a push instruction when an additional result is written to the stack.

12. A method for processing an exchange instruction, the exchange instruction for exchanging the contents of an exchange-destination register with the contents of an exchange-source register, the method comprising:

processing a preceding instruction that occurs before the exchange instruction in an instruction stream, when the preceding instruction is a stack-based instruction that writes a result to the stack-top, the preceding instruction having a first destination-register specifier which is a current stack-top register;

replacing the first destination-register specifier for the preceding instruction with an exchange-source specifier that specifies the exchange-source register, wherein the preceding instruction writes the result to the exchange-source register instead of the current stack-top register;

processing a following instruction that occurs after the exchange instruction in the instruction stream, when the following instruction is a stack-based instruction that reads a source operand from the stack-top, the following instruction having a first source-register specifier which is the current stack-top register;

replacing a second source-register specifier of the following instruction with the exchange-source specifier, wherein the following instruction reads the source operand from the exchange-source register instead of a second source register; and removing the exchange instruction from further processing by a processor when the first destination-register specifier is replaced with the exchange-source specifier and the second source-register specifier is replaced with the exchange-source specifier, whereby a first half of the exchange instruction is processed by the preceding instruction and a second half of the exchange instruction is processed by the following instruction.

13. The method of claim 12 further comprising:

inserting a first move flow into a pipeline when the exchange instruction is processed and the first destination-register specifier is not replaced with the exchange-source specifier; and inserting a second move flow into the pipeline when the exchange instruction is processed and the second source register specifier is not replaced with the exchange-source specifier, whereby the exchange instruction is processed by the first and second move flows when the first destination-register specifier and the second source register specifier are not replaced with the exchange-source specifier.

14. The processor of claim 13 wherein the first move flow is inserted into the pipeline during a first clock cycle and the second move flow is inserted into the pipeline during a second clock cycle, whereby the exchange instruction processed by the first and second move flows requires two clock cycles of latency.

15. The processor of claim 13 wherein the preceding instruction immediately precedes the exchange instruction and the following instruction immediately follows the exchange instruction, and wherein the following instruction immediately follows the preceding instruction in a next clock cycle when the exchange instruction is removed from further processing.

16. The processor of claim 12 further comprising the step of:

inserting a second move flow into a pipeline when the exchange instruction is processed when the following instruction does not immediately follow the exchange instruction and not replacing the second source register specifier with the exchange-source specifier, whereby the first half of the exchange instruction is processed by the preceding instruction but the second half of the exchange instruction is processed by the second move flow and not the following instruction when the following instruction does not immediately follow the exchange instruction.

17. A translator circuit for a processor, the translator circuit for translating stack-based instructions into random-access-register-based instructions, the translator circuit for further translating stack-based instructions to process a portion of a register-exchange instruction, the translator circuit comprising:

a plurality of registers, each register for storing an operand or a result;

a top-of-stack pointer register containing a pointer identifying a stack-top register in the plurality of registers;

incrementing means for incrementing the pointer to the stack-top register, the pointer pointing to a different one of the registers in the plurality of registers after being incremented;

exchange-source means for receiving an exchange-source position identifying a position relative to the stack-top register of an exchange-source for the register-exchange instruction, wherein a destination of the register-exchange instruction is the stack-top register;

destination adder means, receiving the exchange-source position from the exchange-source means, and receiving the pointer to the stack-top register, for adding the exchange-source position to the pointer and outputting a sum as a first output when the register-exchange instruction and a preceding instruction are simultaneously being processed by the translator circuit, and when the preceding instruction specifies that a result be written to the stack-top register, the destination adder means otherwise outputting the pointer to the stack-top register as the first output; and destination-specifier means, receiving the first output from the destination adder means, for identifying one of the registers in the plurality registers as a destination o, wherein the destination register of the preceding instruction is translated from the stack-top register to the exchange-source register when the register-exchange instruction and the preceding instruction are simultaneously being processed by the translator circuit.

18. The translator circuit of claim 17 further comprising:

last exchange-source means, receiving the exchange-source position from the exchange-source means, for storing the exchange-source position for use by a following instruction in a following clock cycle after a first clock cycle when a register-exchange instruction has been processed by the translator circuit;

source adder means, receiving the exchange-source position from the last exchange-source means, and receiving the pointer to the stack-top register, for adding a last exchange-source position to the pointer and outputting a second sum as a second output when the register-exchange instruction was processed by the translator circuit, and when the following instruction specifies that a source operand be read from the stack-top register, the source adder means otherwise outputting the pointer to the stack-top register as the second output; and source-specifier means, receiving the second output from the source adder means, for identifying one of the registers in the plurality of registers as a source register that a source operand of the following instruction will be read from, wherein the source register of the following instruction is translated from the stack-top register to the exchange-source register when the register-exchange instruction was processed by the translator circuit during the first clock cycle.

19. The translator circuit of claim 18 wherein each register in the plurality of registers stores the operand or the result in a floating point format, each register having a mantissa portion and an exponent portion.

20. The translator circuit of claim 18 further comprising:

second-source means for receiving a second-source position identifying a position relative to the stack-top register of a second-source operand for the preceding instruction;

second-source adder means, receiving the second-source position from the second-source means, and receiving the pointer to the stack-top register, for adding the second-source position to the pointer and outputting a third sum as a third output; and second-source-specifier means, receiving the third output from the second-source adder means, for identifying one of the registers in the plurality registers as a second-source register that a second-source operand of the following instruction will be read from, wherein the following instruction requires two operands, a first operand and a second operand, the first operand being read from the source register which is translated from the stack-top register to the exchange-source register when the register-exchange instruction was processed by the translator circuit during the first clock cycle.

* * * * *